(12) United States Patent
Twede et al.

(10) Patent No.: US 11,263,320 B2
(45) Date of Patent: Mar. 1, 2022

(54) UPDATING FIRMWARE

(71) Applicant: Hewlett-Packard Development Company, L.P., Spring, TX (US)

(72) Inventors: Roger S Twede, Boise, ID (US); Samuel Marshall Lester, Boise, ID (US); Brandon R Ashey, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 194 days.

(21) Appl. No.: 16/478,414

(22) PCT Filed: Jan. 20, 2017

(86) PCT No.: PCT/US2017/014415
§ 371 (c)(1),
(2) Date: Jul. 16, 2019

(87) PCT Pub. No.: WO2018/136086
PCT Pub. Date: Jul. 26, 2018

(65) Prior Publication Data
US 2020/0387604 A1  Dec. 10, 2020

(51) Int. Cl.
*G06F 11/00* (2006.01)
*G06F 12/14* (2006.01)
*G06F 12/16* (2006.01)
*G08B 23/00* (2006.01)
*G06F 21/55* (2013.01)
(Continued)

(52) U.S. Cl.
CPC ............ *G06F 21/554* (2013.01); *G06F 21/54* (2013.01); *G06F 21/572* (2013.01); *G06F 21/577* (2013.01)

(58) Field of Classification Search
CPC ...... G06F 21/554; G06F 21/54; G06F 21/572; G06F 21/577; G06F 21/57; G06F 21/52
See application file for complete search history.

(56) References Cited

U.S. PATENT DOCUMENTS 6,930,785 B1 *  8/2005  Weyand ................ G06F 3/1204
                                                       358/1.1
7,469,139 B2    12/2008  Van de Groenendaal
(Continued)

FOREIGN PATENT DOCUMENTS

WO     WO-07061167       5/2007

OTHER PUBLICATIONS

HCL ERS ~ White Paper—Secure Firmware Upgrade System, Jun. 2014, https://www.google.co.in/ ~ 13 pages.
(Continued)

*Primary Examiner* — Trong H Nguyen
(74) *Attorney, Agent, or Firm* — Brooks Cameron & Huebsch PLLP

(57) ABSTRACT

Example implementations relate to updating firmware. For example, a system according to the present disclosure may include a printing device and a computing device. The printing device may be on a network. The printing device may detect an intrusion against the printing device. The computing device may be on the network. The computing device may receive a broadcast reporting the intrusion directly from the printing device. The computing device may request, responsive to receiving the broadcast, an updated portion of a firmware code image for the computing device.

15 Claims, 3 Drawing Sheets

(51) Int. Cl.
*G06F 21/54* (2013.01)
*G06F 21/57* (2013.01)

(56) References Cited

U.S. PATENT DOCUMENTS

| | | | |
|---|---|---|---|
| 7,596,807 B2 | 9/2009 | Ptacek et al. | |
| 8,490,868 B1* | 7/2013 | Kropf | G06Q 20/108 |
| | | | 235/379 |
| 8,898,654 B2 | 11/2014 | Young et al. | |
| 9,258,323 B1 | 2/2016 | Callon | |
| 10,657,262 B1* | 5/2020 | Cui | G06F 21/577 |
| 2005/0005152 A1* | 1/2005 | Singh | G06F 21/577 |
| | | | 726/26 |
| 2005/0138433 A1 | 6/2005 | Linetsky | |
| 2005/0177720 A1* | 8/2005 | Katano | H04L 9/00 |
| | | | 713/165 |
| 2006/0092861 A1 | 5/2006 | Corday et al. | |
| 2008/0140795 A1 | 6/2008 | He et al. | |
| 2015/0121449 A1* | 4/2015 | Cp | H04L 63/20 |
| | | | 726/1 |
| 2016/0021121 A1* | 1/2016 | Cui | G06F 21/54 |
| | | | 726/1 |
| 2018/0121653 A1* | 5/2018 | Akita | G06F 21/84 |

OTHER PUBLICATIONS

Network Printer Security Best Practices, Apr. 3, 2016, https://security.berkeley.edu/ ~ retrieved from internet ~ Jul. 2, 2019 ~ 3 pages.

Ang Cui et al.: "When Firmware Modifications Attack: A Case Study of Embedded Exploitation", Jan. 1, 2013~ Retrieved from the Internet ~ 13 pages.

* cited by examiner

UPDATING FIRMWARE

BACKGROUND

A cyber-attack may exploit an attack vector present in a code image residing in a device on a network. A network may include a plurality of devices. The plurality of devices on the network may share common portions of code image in their firmware. The plurality may, therefore, share common attack vectors within their firmware. As such, the plurality of devices may be vulnerable to the same exploit. A strategy to reduce the effectiveness of a cyber-attack may include replacing the firmware code image in a device.

DETAILED DESCRIPTION

Figure 1:
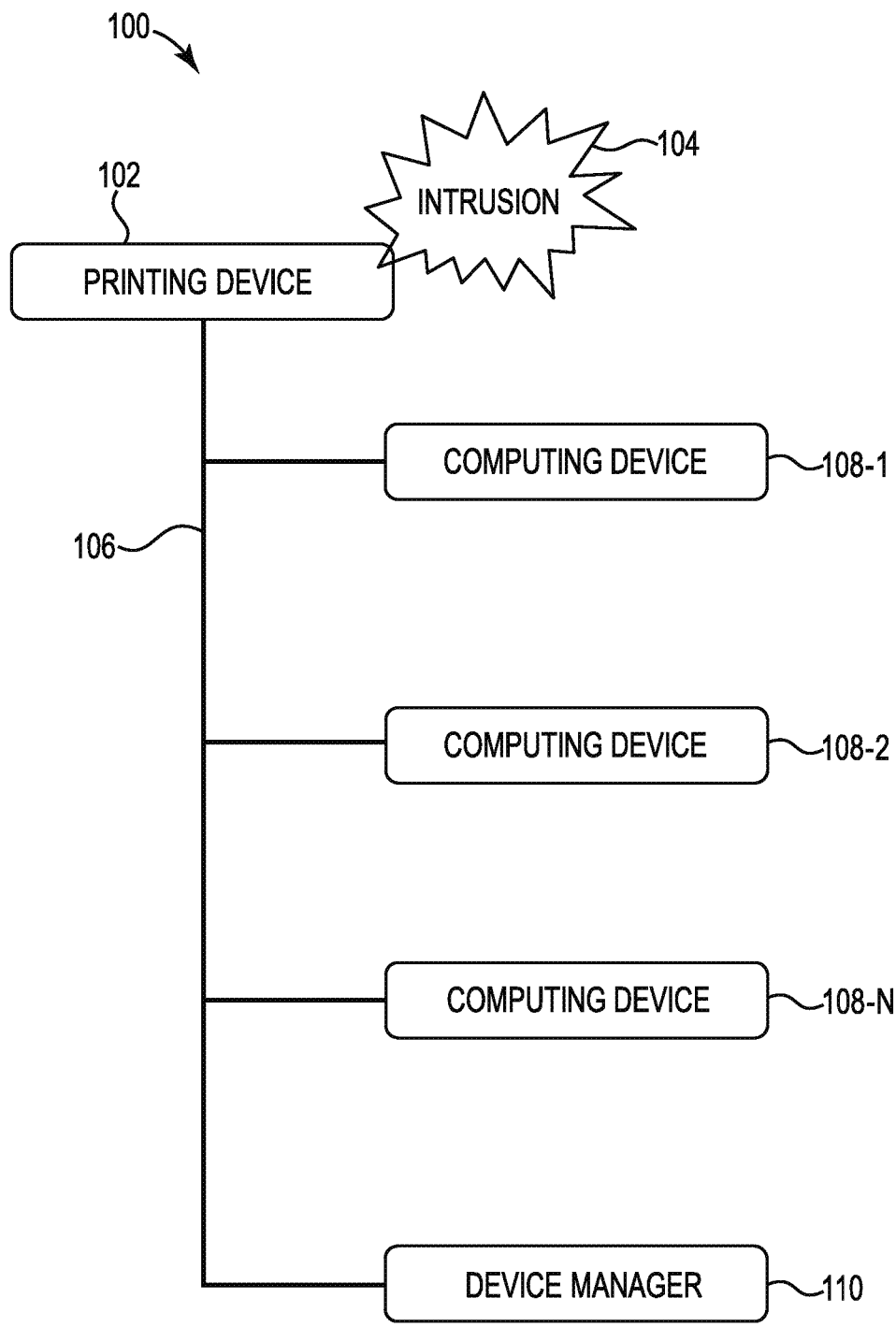
FIG. 1 illustrates a diagram of an example of a system for updating firmware according to the disclosure.

As used herein, a printing device may include a peripheral device that is configured to print, copy, scan, and/or fax documents utilizing digital files. For example, a printing device may include a printer such as a personal printer, an enterprise level printer, a plotter, a digital printing press, a page-wide ink array, a three-dimensional printer, and/or a multi-function printer. A printing device may be connected to a network. The printing devices may communicate across the network and the printing devices may execute print jobs communicated to them across the network.

A cyber-attack may target a printing device. A cyber-attack targeting a printing device may exploit an attack vector present in a firmware code image of the printing device. A cyber-attack may exploit attack vectors to exfiltrate data, spy on data, alter settings, and a host of other malicious activities by modifying portions of the firmware image of the printing device.

Networks may utilize different strategies for detecting and mitigating such cyber-attacks. For example, some networks may utilize expensive and network infrastructure intensive intrusion detection systems. For example, some networks may include intrusion detection systems that sniff every packet transmitted in the network and make a determination as to whether it is malicious and/or log network events such as error reports. Such intrusion detection systems may report detected activity to a network administrator monitoring a network administration dashboard and/or collect the determinations and/or logs centrally.

Some networks may rely on the devices on the networks to provide a modicum of intrusion detection for themselves. For example, some networks may rely on intrusion detection systems on the devices themselves. For example, the network may rely on a networked device to detect an intrusion, throw an error on a display of the device, and then to become unusable until it is power cycled or other manual human intervention is performed.

In any event, mitigation of the intrusion involves human interaction. For example, if a potentially malicious event is reported to a network administrator via logging an error, via reporting an event to a network event monitor, or via a display on an afflicted device, a network administrator may eventually address the issue by, for example, updating the firmware of an afflicted device.

Further, some networks may contain a plurality of devices of the same make and/or the same model. These devices may share common features among their firmware code images. The commonalities in their firmware code images may render the plurality of devices vulnerable to a same or similar exploit. Presently, even if two devices on a network share potential attack vectors, there is no shared knowledge of an exploit or common mitigation efforts employed in networks.

In contrast, examples described herein may implement a system utilizing on-device intrusion detection and network broadcasts to report an intrusion and trigger cross-device mitigation without human intervention. For example, the system may include a printing device to detect an intrusion against the printing device on a network and a computing device on the network to receive a broadcast reporting the intrusion directly from the printing device and request, responsive to receiving the broadcast, an updated portion of a firmware image of the computing device.

FIG. 1 illustrates a diagram of a system 100 for updating firmware, according to the present disclosure. The system 100 may include a printing device 102. The printing device 102 may include an on-board intrusion detection system.

The on-board intrusion detection system may include instructions on a printing device 102 executable by a processor on the printing device 102 to detect an intrusion 104 on the printing device 102. As used herein, an intrusion 104 on the printing device 100 may include a malicious alteration or augmentation of a code image executing on a printing device 102 away from a pristine firmware code image.

As used herein, a code image may include source code that may be installed on the printing device 102. The code image may include source code such as firmware or software. The source code may include a collection of computer instructions executable by a processor. The source code may, as a result, have or be associated with a functionality defined by the actions resulting from execution of the computer instructions. The code image may include the binary code defining the computer instructions. As used herein, a pristine firmware code image may be a firmware code image that is identical to a target firmware code image associated with the printing device 102. The target firmware code image may be a firmware code imaged that is provided by a manufacturer and/or an administrator of the printing device 102. The target firmware code image may be a firmware code image that is original to the device, non-malicious, has a legitimate and permitted source, and/or is a firmware code image that is sanctioned by a manufacturer and/or administrator of the printing device 102.

The on-board executable instruction based intrusion detection system may detect malicious alterations and/or augmentations of the code image of the printing device 100 firmware by repeatedly monitoring code image present on the printing device 100. Repeatedly monitoring the code image may include monitoring the memory of the printing device 100 where the code image of the firmware is executing. If a new digital link library (DLL) is injected into the printing device 102 (e.g., an intrusion 104 against the printing device 102) then the memory may change from a previous checksum, Therefore, the on-board intrusion detection system may repeatedly monitor the memory of the printing device 102, create checksums corresponding to portions of the memory, repeatedly scan those same portions of the memory, and compare a checksum resulting from the scan to a target checksum corresponding to the pristine code image of the firmware for that portion of memory. If the on-board intrusion detection system detects that a checksum for a portion of memory has changes, then the printing device 102 knows that an intrusion 104 against it has occurred and it may be under a cyber-attack. Utilizing such an on-board executable instruction based intrusion detection system may allow the precise portion of memory and/or DLL of the printing device that has been altered and/or augmented.

Alternatively, economy printing devices 102 may utilize a less sophisticated on-board intrusion detection systems and/or physical components to offer a more competitively priced product. Examples may include utilizing an on-board hardware-based intrusion detection system to detect intrusions 104. For example, such a printing device 102 may utilize an Application Specific Integrated Circuit (ASIC)-based on-board instruction detection system to monitor the check sums of the code image of the firmware on the printing device 102. The printing device 102 may utilize the code image of the firmware from a continuous block of memory and the ASIC-based on-board instruction detection system may not differentiate between distinct altered and/or augmented DLLs, but may simply determine that there has been an intrusion 104 to the printing device 100.

The printing device 102 may be connected to a network 106. A network 102 may include a data link that allows the printing device 102 to exchange data with other devices (e.g., computing devices 108-1 . . . 108-N) on the network 102. The connections between the printing device and the other devices on the network 102 may be stablished utilizing cable media and/or wireless media. The network 102 may be a personal area network, a local area network, a home area network, a campus area network, and/or a wide area network. The network 102 may be part of and/or in communication with an intranet, extranet, internetwork, and/or the Internet.

As described above, other devices may be connected to the network 106. The other devices on the network may include computing devices 108-1 . . . 108-N. As used herein, a computing device 108-1 . . . 108-N may include a personal computer, a desktop computer, a laptop computer, a tablet computer, a peripheral, and/or additional printing devices. A portion of the computing devices 108-1 . . . 108-N may be a same device type, have a same manufacturer, have a same brand, be a same make, and/or be a same model as the printing device 102. This portion of the computing devices 108-1 . . . 108-N may share a common portion of a code image of firmware to the printing device 102.

A device manager 110 may be connected to the network 106. For example, a device manager 110 may operate on a server connected to the network 106. The device manager 110 may be located on the network 106 or remote from the network 106. As used herein, the device manager 110 may include instructions executable by a processor to manage installation, discovery, configuration, grouping, template production, diagnostics, firmware upgrades, troubleshooting, maintenance, supply management, and/or operation of a portion of the printing device 102 and the computing devices 108-1 . . . 108-N on the network 106. For example, the device manager 110 may be a printing device manager that includes instructions executable by a processor to manage a feet of printing devices.

The printing device 102, the computing devices 108-1 . . . 108-N, and/or the device manager 110 may communicate with one another across the network 106. For example, the printing device 102 may communicate a notice of an intrusion 104 against it to the computing devices 108-1 . . . 108-N across the network 106. The printing device 102 may report the intrusion 104 to the computing devices 108-1 . . . 108-N via a broadcast sent directly from the printing device 102 across the network 106. For example, the broadcast may include a network event such as a simple network management protocol (SNMP) event. An SNMP may include an object identifier (OID) that may define an identity of the printing device 102 that has detected the intrusion 104. The broadcast may not be transmitted from the printing device 102 to the computing devices 108-1 . . . 108-N directly in such an example, but may be a network-wide communication that the computing devices 108-1 . . . 108-N may pick up off the network 106. For example, where the computing devices 108-1 . . . 108-N are printing devices, they may pick up the broadcast via a transmission control protocol (TOP) port 9100 communication. As such a broadcast reporting the intrusion 104 may be received directly from the printing device 102 (e.g., without the intervention of other devices or network utilities) without being directed to a particular portion of the computing devices 108-1 . . . 108-N.

In reporting the intrusion 104, the broadcast from the printing device 102 may report and/or communicate by virtue of formatting or metadata additional information regarding the printing device 102 and/or the intrusion 104. For example, the broadcast from the printing device 102 may identify a device type, manufacturer, brand, make, and/or model of the printing device 102. Alternatively, the broadcast may only be received and/or understood by a computing device 108-1 . . . 108-N that is a same device type, has a same manufacturer, has a same brand, is a same make, and/or is a same model as the printing device 102 sending the broadcast. While broadcast may communicate simply that an intrusion 104 has occurred to the printing device 102 the broadcast may also report specifics of the intrusion 104 such as a portion of the memory or DLL of the printing device 102 that was altered or augmented in the intrusion 104.

The broadcast may include instructions and/or trigger instructions executable by a processor of the computing device 108-1 . . . 108-N to be executed that initiate a request by the receiving computing device 108-1 . . . 108-N, That is, responsive to receiving the broadcast, a computing device 108-1 . . . 108-N may generate a request for an updated portion of a code image of firmware executing on the requesting computing device 108-1 . . . 108-N. It may be appreciated that where computing devices 108-1 . . . 108-N share common characteristics (e.g., device type, manufacturer, brand, make, and/or model) with a printing device 102, the computing devices 108-1 . . . 108-N may share common vulnerabilities. As such, in the event of an exploit of an attack vector in the code image of the firmware of printing device 102, security of the network 106 and the computing devices 108-1 . . . 108-N thereupon may be improved by mitigating common vulnerabilities.

An updated code image of firmware may include a new and/or altered version of the firmware currently executing on the requesting computing device 108-1 . . . 108-N. An updated code image of firmware may include a different version of the code image of the firmware. An updated code image of firmware may not be part of a global version update for a device, but rather may be a new or altered version of currently executing firmware implicated by an event such as an intrusion 104. An updated code image of firmware may not be part of a global improvement or bug fix for firmware executing on device, but rather may be a code image functionally identical to an existing code image being executed distinguishable by a distinct binary signature.

A code image diversity strategy may be employed across the printing device 102 and/or each of the computing devices 108-1 ... 108-N may be implemented. Code image diversity may include requesting from and/or supplying to each of the printing devices 108-1 ... 108-N a different and/or randomized code image of firmware. In such examples, the request from the computing device 108-1 ... 108-N may be a request for an updated portion of a code image for firmware operating on the requesting computing device 108-1 ... 108-N that has a unique binary signature (e.g., checksum) relative to other versions of the code image for firmware that may exist and/or be supplied to other computing devices 108-1 ... 108-N and/or printing devices 102 on the network 106.

The request for an updated portion of a code image of firmware transmitted by a computing device 108-1 ... 108-N responsive to receiving the broadcast may include various levels of detail. For example, the request may request an updated version of the entire code image of firmware. As another example, the request may specify a portion of the memory and/or DLL of the printing device 102 that was targeted by the intrusion 104 and/or request and updated of only the corresponding portion of the code image of its firmware. As yet another example, the request may request a replacement of the entire code image of the firmware, but specify particular portions of the code image to be randomized and/or changed.

The request may include instructions to another device or utility to mediate the identification and/or download of the updated portion of the code image of the firmware. Alternatively, the identification and/or download of the updated portion of the code image of the firmware from a separate repository may be executed by the computing device 108-1 ... 108-N.

The computing device 108-1 ... 108-N may connect to a device manager 110 to request the updated portion of the code image of the firmware. As described above, the device manager 110 may be a printing device manager and the computing device 108-1 ... 108-N may be a printing device. The device manager 110 may be local to the network 106, such as executing on a server node of the network 106. The device manager may act as a repository for updated code images of firmware for the various devices that it manages. The device manager may act as an agent for identifying and retrieving updated code images for firmware for the various devices that it manages. The device manager 110 may, in response to and in accord with the request, transmit or otherwise facilitate the download of the updated portion of the code image of the firmware to the computing device 108-1 ... 108-N requesting the update.

Although not illustrated as such in FIG. 1, the device manager 110 may be located on a remote server relative to the network 106. For example, the device manager 110 may include a remote server and/or website of a manufacturer and/or firmware manager for a printing device 102 and/or a computing device 108-1 ... 108-N. Responsive to receiving the broadcast reporting the intrusion 104 from the printing device 102, a computing device 108-1 ... 108-N may connect to the remote server to request the updated portion of the code image. The remote server may, in response to and in accord with the request, transmit or otherwise facilitate the download of the updated portion of the code image of the firmware to the computing device 108-1 ... 108-N requesting the update.

FIG. 1 is illustrated with regard to a printing device 102. However, examples may include any computing device serving the role described with respect to the printing device 102. For example, the system 100 may include a first computing device on a network to detect an intrusion against the first computing device. The first computing device may utilize an on-board intrusion detection system to detect the intrusion independent of a separate intrusion detection system. The first computing device may directly broadcast a report of the intrusion. A second computing device (e.g., 108-1 ... 108-N) may receive the broadcast reporting the intrusion directly from the first computing device. The second computing device (e.g., 108-1 ... 108-N) may request, responsive to receiving the broadcast, an updated portion of a firmware code image for the second computing device (e.g., 108-1 ... 108-N).

Figure 2:
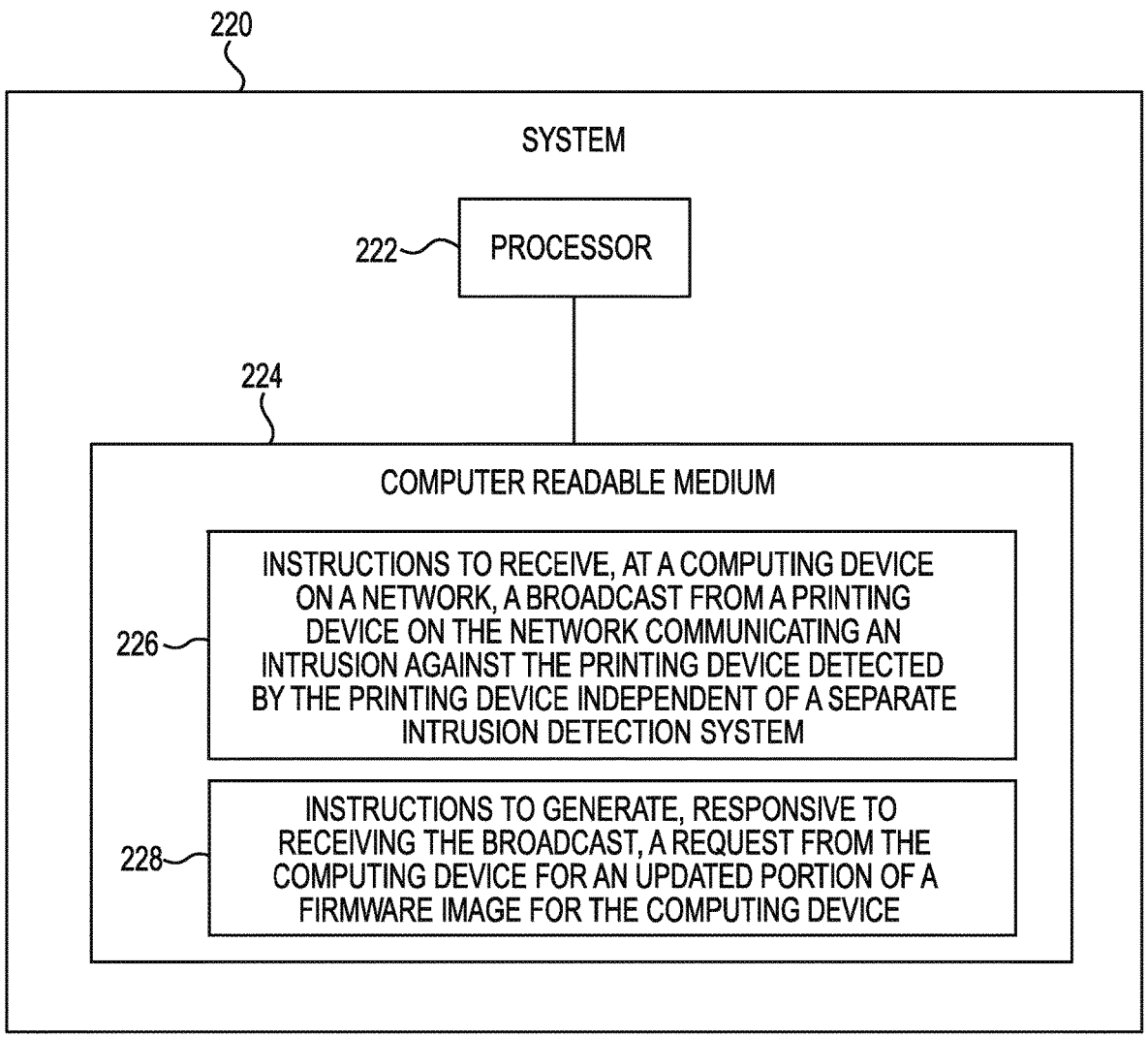
FIG. 2 is a block diagram of an example of a system for updating firmware according to the disclosure.

FIG. 2 is a block diagram of an example system 220 for updating firmware variants, according to the present disclosure. System 220 may be the same as or different than, system 100 illustrated in FIG. 1. System 220 may include at least one computing device that is capable of communicating with at least one remote system. In the example of FIG. 2, system 220 includes a processor 222 and a computer-readable medium 224. Although the following descriptions refer to a single processor and a single computer-readable medium, the descriptions may also apply to a system with multiple processors and computer-readable mediums. In such examples, the instructions may be distributed (e.g., stored) across multiple computer-readable mediums and the instructions may be distributed (e.g., executed by) across multiple processors.

Processor 222 may be a central processing unit (CPUs), a microprocessor, and/or other hardware devices suitable for retrieval and execution of instructions stored in computer-readable medium 224. In the particular example shown in FIG. 2, processor 222 may receive, determine, and send instructions 226, and 228 for updating firmware. As an alternative or in addition to retrieving and executing instructions, processor 222 may include an electronic circuit comprising a number of electronic components for performing the functionality of an instruction in computer-readable medium 224. With respect to the executable instruction representations (e.g., boxes) described and shown herein, it should be understood that part or all of the executable instructions and/or electronic circuits included within a particular box and/or may be included in a different box shown in the figures or in a different box not shown.

Computer-readable medium 224 may be any electronic, magnetic, optical, or other physical storage device that stores executable instructions. Thus, computer-readable medium 224 may be, for example, Random Access Memory (RAM), an Electrically-Erasable Programmable Read-Only Memory (EEPROM), a storage drive, an optical disc, and the like. Computer-readable medium 224 may be disposed within system 220, as shown in FIG. 2. In this situation, the executable instructions may be "installed" on the system 220. Additionally and/or alternatively, computer-readable medium 224 may be a portable, external or remote storage medium, for example, that allows system 220 to download the instructions from the portable/external/remote storage medium. In this situation, the executable instructions may be part of an "installation package". As described herein, computer-readable medium 224 may be encoded with executable instructions for scanning with destination marks.

Referring to FIG. 2, instructions 226, when executed by a processor (e.g., 222), may cause system 220 to receive, at a computing device on a network, a broadcast from a printing device on the network. The broadcast may communicate an intrusion against the printing device. An intrusion against the printing device may include a malicious modification of a portion of an existing code image of firmware executing on the printing device.

The intrusion against the printing device may be detected by the printing device independent of a separate intrusion detection system. Instead, the intrusion against the printing device may be detected by an on-board intrusion detection system and its detection may be broadcast as a network event across a network.

The broadcast may include information about the intrusion. For example, the broadcast may include an identification of a specific DLL of the printing device that was modified in the intrusion.

Instructions 228, when executed by a processor (e.g., 222), may cause system 220 to generate, responsive to receiving the broadcast, a request from the computing device that received the broadcast for an updated portion of a code image of the firmware for the computing device. That is, receiving the broadcast from the printing device reporting an intrusion may trigger the computing device to generate a request. An ability of the broadcast to trigger the request from the computing device may be dependent upon the computing device sharing common characteristics (e.g., device type, manufacturer, brand, make, and/or model) with the printing device that sent the broadcast. For example, the ability of the broadcast to trigger the request from the computing device may be predicated on the computing device and the printing device that sent the broadcast sharing a common make. The request for an updated portion of a code image of firmware may be generated by the computing device independent of any human interaction. Devices on the network that do not share the common characteristic may not generate the request for an updated portion of a code image of firmware and may, therefore, remain vulnerable to attack vectors remaining in the code image of their firmware.

Figure 3:
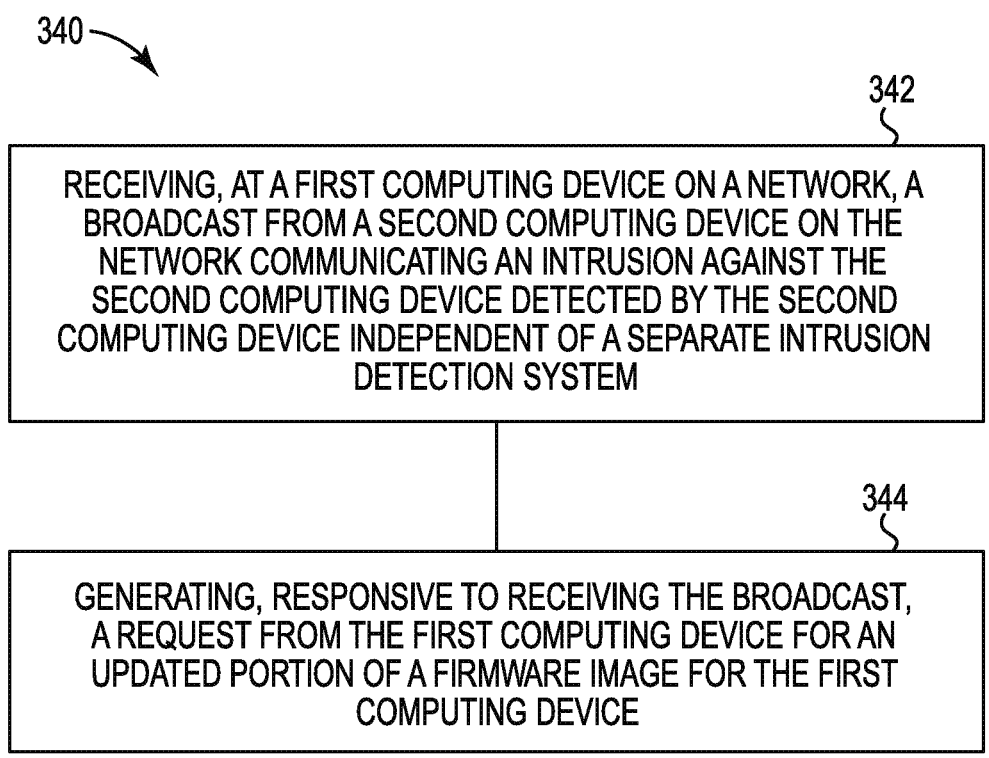
FIG. 3 illustrates an example method for updating firmware, according to the disclosure.

FIG. 3 illustrates an example method 340 for updating firmware, according to the present disclosure. At 342, the method 340 may include receiving a broadcast at a first computing device on a network. The broadcast may be a network event broadcast. The broadcast may by broadcast from a second computing device on the network.

The broadcast may communicate an intrusion against the second computing device. The intrusion may be detected by the second computing device independent of a separate intrusion detection system. The second computing device may utilize an intrusion detection system that is entirely on-board the second computing device to detect the intrusion and generate the broadcast, At 344, the method 340 may include generating a request from the first computing device for an updated portion of a code image of firmware for the first computing device. The request may be generated responsive to receiving the broadcast from the second computing device. The request may be generated by the first computing device independent of any human intervention.

The method 340 may include receiving an updated portion of a code image of firmware at the first computing device. The updated portion of the code image of firmware may have a unique binary signature. For example, the code image of the firmware may have a binary signature that is different from the code image of the firmware executing on other computing devices of the same make and model connected to the network.

In an example where a network has a plurality of computing devices of the same make and model connected to it, the broadcast may be received by all the devices with the same make and model. All these computing devices may then independently generate a request for an updated portion of a code image of firmware for themselves. In this example, each of the computing devices may receive an updated portion of a code image of firmware that has a binary signature that is unique with respect to all of the others. That is, each of the devices will have a different randomized code image of their firmware after receiving and installing the updated portion of the code image of firmware.

The method 340 may include executing, responsive to receiving the broadcast from the second computing device, a preset action at the first computing device in addition to generating the request. For example, the second computing device may come configured with and/or have configurable preset actions to take in response to receiving a broadcast from another computing device on the network communicating that is has detected an intrusion. Example preset actions may include forcing a shutdown of the second computing device, augmenting a device firewall of the second computing device, displaying a notification on the display of the second computing device, blocking off the firewall of the second computing device so that printing over the network is disabled but the second computing device may still function as a cabled connection printer, scanner, copier, fax machine, etc.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A system comprising:
   a printing device on a network to:
   detect an alteration of a portion of firmware of the printing device by an intrusion against the printing device;
   send a network-wide broadcast across the network without directing the network-wide broadcast to a particular computing device on the network, wherein the broadcast is formatted to be understandable only by devices on the network having a same device type as the printing device, and wherein the network-wide broadcast identifies the altered portion of the firmware of the printing device;

a computing device on the network to:
receive the network-wide broadcast directly from the printing device; and
request, responsive to receiving the network-wide broadcast, an updated firmware code image for the computing device with a portion of the requested firmware code image for the computing device corresponding to the altered portion of the firmware of the printing device being distinct from the altered portion of the firmware of the printing device.

2. The system of claim 1, wherein the network-wide broadcast is a network event sent out by the printing device across the network, wherein the network-wide broadcast is a transmission control protocol (TCP) port communication available to be picked up off the network by each of a plurality of computing devices, including the computing device.

3. The system of claim 1, wherein the printing device detects the intrusion utilizing a hardware-based intrusion detection system on the printing device, wherein the hardware-based intrusion detection system comprises an application specific integrated circuit to monitor check sums of an executing code image of the firmware of the printing device.

4. The system of claim 1, wherein the printing device detects the intrusion utilizing intrusion detection instructions on the printing device by creating checksums corresponding to portions of a memory of the printing device, repeatedly scanning the portions of the memory for comparison to corresponding checksums, and detecting an alteration to the altered portion of firmware of the printing device based on a checksum discrepancy identified by the comparison.

5. The system of claim 1, wherein the computing device connects to a printing device manager on the network to request the updated firmware code image.

6. The system of claim 1, wherein the computing device connects to a remote server to request the updated firmware code image.

7. The system of claim 1, wherein the portion of the requested firmware code image is uniquely randomized to meet the request and is not part of a global firmware release.

8. A non-transitory computer-readable medium containing instructions executable by a processor to cause the processor to:
receive, at a computing device on a network, a network-wide broadcast from a printing device on the network communicating an alteration of a portion of firmware of the printing device by an intrusion against the printing device, wherein the alteration is detected by the printing device independent of a separate intrusion detection system; and
generate, responsive to receiving the network-wide broadcast, a request from the computing device for an updated firmware code image for the computing device, wherein the request specifies a portion of the updated firmware code image for the computing device, corresponding to the altered portion of the firmware of the printing device, to be randomized in the updated firmware code image so that each of a plurality of computing devices on the network including the computing device on the network receive a version of firmware with a distinct portion corresponding to the altered portion of the firmware of the printing device.

9. The non-transitory computer-readable medium of claim 8, wherein an ability of the network-wide broadcast to be interpreted by each of the plurality of computing devices on the network and to trigger the request is dependent upon a computing device receiving the network-wide broadcast sharing a common make with the printing device.

10. The non-transitory computer-readable medium of claim 8, wherein the intrusion against the printing device includes a malicious modification of a portion of an existing firmware code image of the printing device.

11. The non-transitory computer-readable medium of claim 8, wherein the network-wide broadcast includes an identification of a modified dynamic-link library of the printing device and wherein the specified portion of the firmware code image for the computing device is a corresponding dynamic-link library of the computing device.

12. The non-transitory computer-readable medium of claim 8, wherein the request is generated independent of human interaction.

13. A method comprising:
receiving, at a plurality of computing devices on a network, a network-wide broadcast from a detecting computing device on the network communicating a detected alteration of a portion of firmware executing at the detecting computing device caused by an intrusion against the detecting computing device detected by the detecting computing device independent of a separate intrusion detection system, wherein the network-wide broadcast is formatted to be understood and acted on only by devices of the plurality of devices on the network having firmware code identical to the portion of firmware detected to have been altered, and wherein the network-wide broadcast identifies the altered portion of the firmware of the detecting computing device; and
generating, responsive to receiving the network-wide broadcast, a request independently at each of the plurality of computing devices for an updated firmware code image for each of the plurality of computing devices, wherein each request specifies firmware code of a requesting computing device identical to the portion of firmware detected to have been altered at the detecting computing device to be randomized in the updated firmware code image so that each of the plurality of computing devices on the network receive a distinct version of firmware with a distinctly randomized portion corresponding to the portion of firmware detected to have been altered at the detecting computing device.

14. The method of claim 13, including receiving a first distinct version of firmware with a first distinctly randomized portion corresponding to the portion of firmware detected to have been altered at the detecting computing device with a unique binary signature at a first computing device of the plurality of computing devices.

15. The method of claim 13, including, responsive to receiving the network-wide broadcast, disabling printing over the network at a first computing device of the plurality of computing devices.

* * * * *